Oct. 25, 1966 — R. M. CARSON — 3,281,162
WIDE RANGE TOW BAR
Filed June 25, 1964 — 2 Sheets-Sheet 2
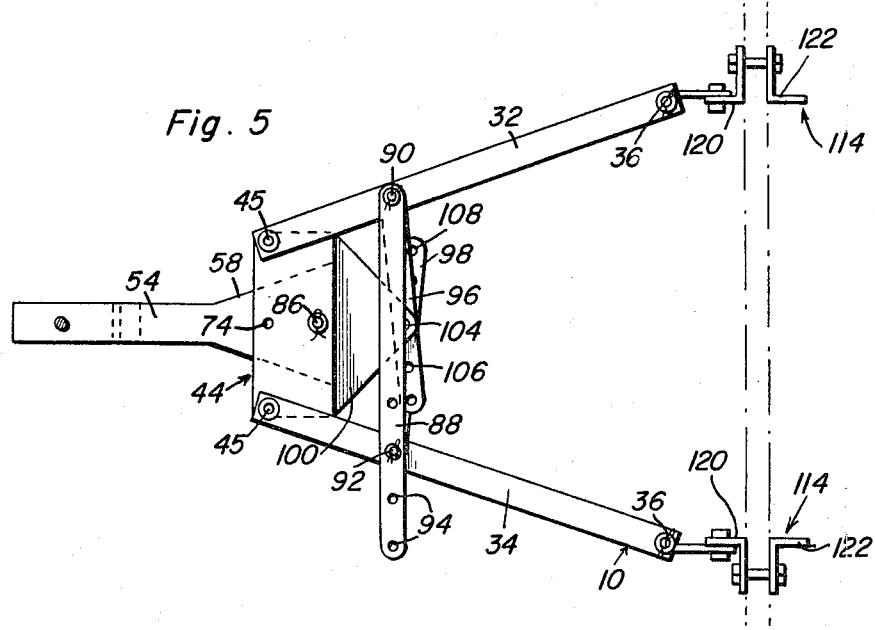
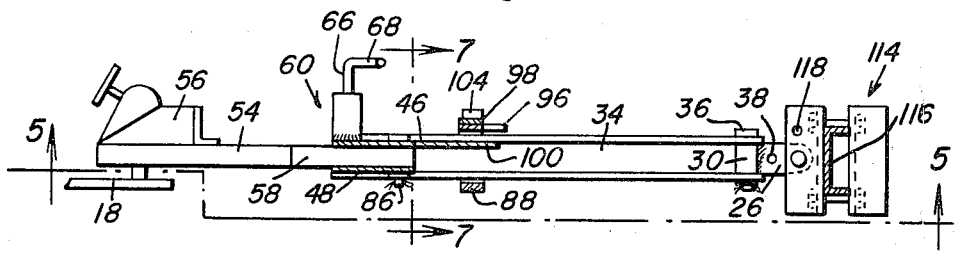
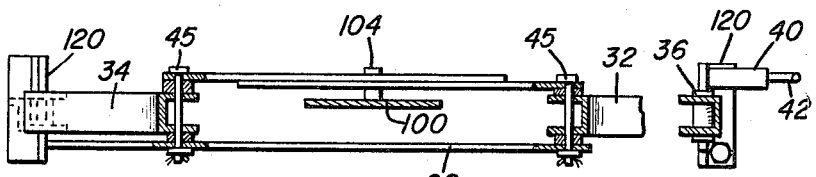
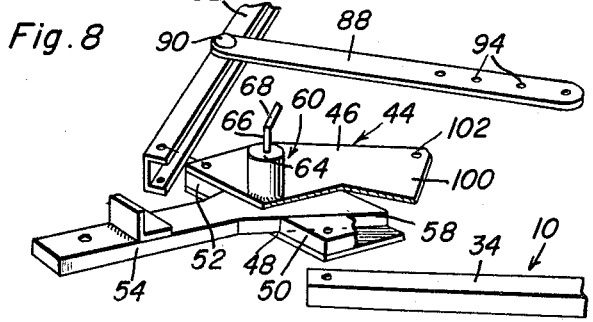
Raymond M. Carson
INVENTOR.

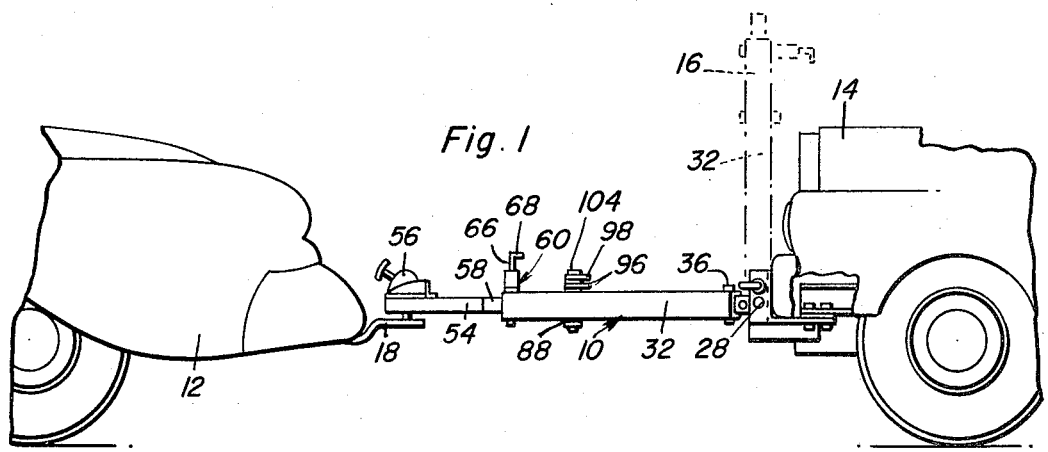
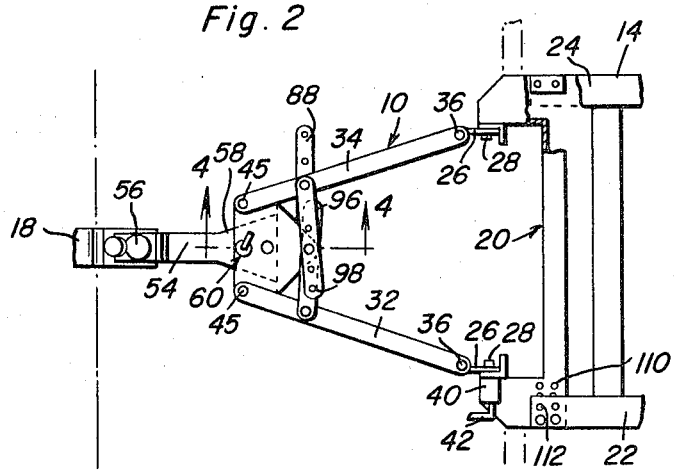
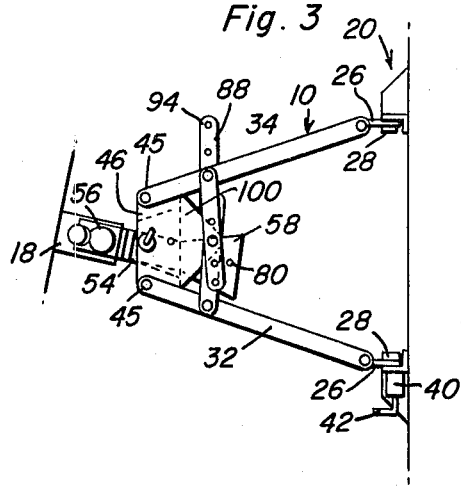
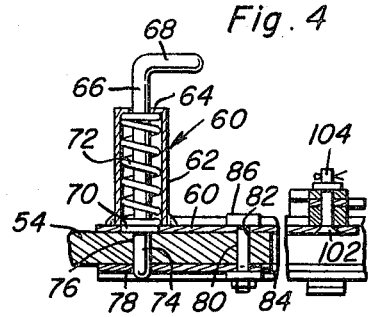

United States Patent Office 3,281,162
Patented Oct. 25, 1966

3,281,162
WIDE RANGE TOW BAR
Raymond M. Carson, Box 101, Faxon, Okla.
Filed June 25, 1964, Ser. No. 377,812
10 Claims. (Cl. 280—478)

This invention relates to a novel and useful wide range tow bar such as that disclosed in my prior U.S. Patent No. 2,918,310, but including improvements thereover.

The tow bar of the instant invention is of the wide range type above referred to and may also be pivoted to an out-of-the-way position when carried by the vehicle which is to be towed.

The improvements of the instant invention over the wide range tow hitch disclosed in my above prior patent reside in the provision of a wide range tow bar including means adapting it to be readily secured to numerous types of vehicles.

Further, the wide range tow bar of the instant invention is constructed in a manner whereby the oscillaltable tongue portion thereof may be swung through a wider arc and therefore cover a greater range.

Still further, the wide range tow bar of the instant invention is constructed in a manner whereby a more rigid connection between the rearwardly diverging mounting arms of the tow bar or hitch and the oscillatable tongue portion thereof is provided.

The main object of this invention is to provide an improved wide range tow bar of the type including an oscillatable tongue portion but constructed in a manner whereby the oscillatable tongue portion may be swung through a greater arc and therefore have a greater range.

Another object of this invention, in accordance with the immediately preceding object, is to provide a wide range tow bar including a pair of rearwardly diverging mounting arms secured to the sleeve portion of the tow bar in a manner whereby the rear ends of the mounting arms may be swung together so as to facilitate storage of the tow bar when the latter is removed from a vehicle.

A still further object of this invention is to provide a wide range tow bar including means supported from its rearwardly divergent support arms specifically designed to enable the tow bar to be secured to various types of vehicles without extensive modifications to the tow bar being necessary.

Yet another object of this invention is to provide a wide range tow bar in accordance with the preceding objects and including means by which a more rigid connection may be established between the sleeve portion of the tow and the oscillatable tongue portion thereof when the tow bar is in use.

A final object of this invention to be specifically enumerated herein is to provide a wide range tow bar in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing the forward end of a towed vehicle and the rear end of a towing vehicle with the wide range tow bar of the instant invention operatively connected between the towing and towed vehicles and an alternate raised inoperative position of the tow bar being shown in phantom lines;

FIGURE 2 is a plan view of the tow bar of the instant invention;

FIGURE 3 is a plan view of the tow bar similar to that of FIGURE 2 but on somewhat of a reduced scale and illustrating the manner in which the tongue portion of the tow bar may be released and oscillated relative to the sleeve portion of the tow bar through which the tongue portion is longitudinally reciprocable;

FIGURE 4 is an enlarged fragmentary vertical sectional view taken substantially upon a plane passing through the center of the tow bar and indicated by the section line 4—4 of FIGURE 2;

FIGURE 5 is a horizontal sectional view taken substantially upon a plane indicated by the section line 5—5 of FIGURE 6;

FIGURE 6 is a side elevational view of the wide range tow bar of the instant invention showing a modified form of mounting assembly;

FIGURE 7 is a transverse vertical sectional view taken substantially upon the plane indicated by the section line 7—7 of FIGURE 6; and FIGURE 8 is a fragmentary exploded perspective view of certain portions of the wide range tow bar more clearly illustrating the structural details thereof and having portions thereof broken away and shown in section.

Referring more specifically to the drawings, the numeral 10 generally designates the wide range tow bar of the instant invention. The tow bar 10 is illustrated in FIGURE 1 of the drawings secured between a towing vehicle 12 and a towed vehicle 14 with a raised inoperative position of the tow bar 10 illustrated in phantom lines as at 16.

The towing vehicle 12 is provided with the usual ball hitch element 18 and a mounting frame generally referred to by the reference numeral 20 having a pair of generally parallel arms interconnected at one pair of corresponding ends by means of a base bight portion and comprising a part of the tow bar 10 is secured to the forward ends of the longitudinal frame members 22 and 24 of the vehicle 14, which forward ends may comprise frame horns. The tow bar 10 includes a pair of short arms 26 which are pivotally secured to the respective arms of the mounting frame 20 by means of pivot pins 28 at one pair of corresponding ends and which include a plurality of upstanding sleeve journals 30 at their other pair of corresponding ends to which the rear ends of a pair of generally coplanar support arms 32 and 34 are pivotally secured by means of pivot fasteners 36. In addition, it may be seen that each of the arms 26 has an aperture 38 formed therethrough which is registrable with a spring-urged latch mechanism 40 supported from the frame 20 for retaining the arms 32 and 34 in their raised inoperative positions illustrated in phantom lines in FIGURE 1 of the drawings. Although only one spring-urged latching mechanism 40 has been illustrated, it is to be noted that each of the short arms 26 may have a latching mechanism 40 operatively associated therewith. Each latching mechanism 40 includes a spring-urged retractable retaining pin 42 which is receivable in the corresponding aperture 38 and therefore is operable to retain the arms 32 and 34 in their raised inoperative positions.

Each of the arms 32 and 34 is generally U-shaped in cross section and the forward ends of the arms 32 and 34 embracingly engage and are pivotally secured to a sleeve assembly generally referred to by the reference numeral 44 by means of pivot fasteners 45, the sleeve assembly 44 defining a base bight portion extending between the adjacent ends of the arms 32 and 34. The sleeve assembly 44 includes a top plate 46 and a bottom plate 48 and a pair of rearwardly divergent spacing members 50 and 52 are secured between the plates 46 and 48 in any convenient manner so as to define a rearwardly opening recess or seat therebetween. An elongated tongue 54 is provided with a female socket hitch element 56 on its forward end which is releasably engageable with the ball carried by the hitch element 18 and the rear end of the tongue 54 includes an enlargement 58 which is snugly and seatingly receivable in the seat defined between the spacing members 50 and 52 and the top and bottom plates 46 and 48 when the tongue 54 is in its forwardmost position. In addition, as can be seen from FIGURE 3 of the drawings, when the tongue 54 is displaced rearwardly from its forwardmost position the enlargement 58 is disposed rearwardly of the seat defined by the sleeve assembly 44. In this position, the tongue 54 is oscillatable about an upstanding axis extending through the forward end of the sleeve at its most restricted portion defined between the forward ends of the spacing members 50 and 52. In this manner, the female socket hitch element 56 may be properly alined with and secured to the ball of the hitch element 18 prior to the enlargement 58 being seated in the seat defined by the sleeve assembly 44.

The top plate 46 has a latching mechanism 60 secured thereto and it may be seen from FIGURE 4 of the drawings that the latching mechanism 60 includes an upstanding body sleeve 62 secured to the top plate 46 and having an apertured top wall 64 through which a retaining pin 66 extending through the sleeve 62 is slidably received. The pin 66 includes a laterally directed upper end portion 68 and a radially outwardly projecting shoulder 70 on its lower end portion disposed within the sleeve 62. A compression spring 72 is disposed about the pin 66 and between the upper or top wall 64 and the shoulder 70 and therefore yieldingly urges the pin 66 into locking engagement with the lower terminal end portion 74 disposed below the shoulder 70 passed through the top plate 64, the bore 76 formed in the tongue 54 and the bore 78 formed in the bottom plate 48. In addition, it may be seen that the tongue 54 and the top and bottom plates 46 and 48 include a second set of registrable bores 80, 82 and 84, respectively, through which a fastener 86 may be removably secured. Still further, it may be seen from FIGURE 5 of the drawings that an elongated brace member 88 is secured between the arms 32 and 34 by means of a pair of pivot pins 90 and 92 secured through the arms 32 and 34 and through the brace 88, the latter being provided with a plurality of longitudinally spaced apertures or bores 94 through which the pivot pin or fastener 92 may be secured. In addition, a pair of endwise overlapping brace arms 96 and 98 are pivotally secured at their remote ends to the arms 32 and 34, respectively, by means of the pivot pins or fasteners 90 and 92. The rear end of the top plate 46 includes an extension 100 which is suitably apertured as at 102 and a pivot fastener 104 is secured through the aperture or bore 102 and a registered pair of the longitudinally spaced bores 106 and 108 spaced longitudinally of the brace members 96 and 98, respectively.

Accordingly, after the forward end of the tongue 54 has been secured to the towing vehicle 12, the towing vehicle 12 may be pulled ahead so as to seat the enlargement 58 in the seat or pocket defined by the sleeve assembly 44. Then, the pin 66 may be allowed to have its lower end portion 74 pass through the registered bores 76 and 78 and the fastener 86 may be secured through the registered bores or apertures 80, 82 and 84.

In order to adapt the tow bar 10 for securement to various types of vehicles, the mounting frame 20 is provided with a plurality of sets of apertures 110 for registry with corresponding apertures 112 formed in the longitudinal members 22 and 24 of the frame of the vehicle 14. In addition, the mounting frame 20 may be replaced by a pair of clamp assemblies generally referred to by the reference numeral 114 and which are adapted to clampingly engage a transverse frame member 116 of a towed vehicle. The clamp assemblies 114 each also includes an aperture 118 corresponding to the aperture or bore 38 for retaining the arms 32 and 34 of the tow bar 10 in the raised inoperative position. Further, the clamp assemblies 114 each include a pair of angle members 120 and 122 which are adapted to clampingly engage the transverse frame member 116 therebetween in order to support the tow bar 10 from the transverse frame member 116.

In view of the pivotable mounting arms 32 and 34, the brace members 88, 96 and 98, as well as the brackets 114 and the mounting frame 20, the tow hitch 10 of the instant invention may be readily secured to various types of vehicles without structural changes being made to either the tow bar 10 or the vehicle to which it is secured.

By registering different pairs of the bores or apertures 106 and 108 with each other and different ones of the bores or apertures 94 with the fastener 92, the distance between the rear ends of the mounting arms 32 and 34 may be varied as desired. In addition, when the fasteners 92 and 104 are removed, the rear ends of the arms 32 and 34 may be swung together after the tongue 54 has been shifted rearwardly to a collapsed position. With the support arms 32 and 34 swung together at their rear ends, storage of the tow bar 10 is greatly facilitated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A wide range tow bar comprising generally horizontally disposed sleeve means including front and rear ends, an elongated tongue longitudinally slidable through said sleeve means, said sleeve means defining a rearwardly opening flared seat, the rear end portion of said tongue including an enlargement seatingly receivable in said seat, said sleeve means and tongue including coacting opposing bearing surfaces preventing angular displacement of said tongue relative to said sleeve means about a horizontal transverse axis, said sleeve means including a transversly restricted forward end portion of limited longitudinal extent through which said tongue is received and providing for limited angular displacement of said tongue relative to said sleeve means about an upstanding axis extending through said tongue and the transversely restricted portion of said sleeve means when said enlargement is rearwardly displaced from said seat, releasable latch means carried by said sleeve means and engageable with said tongue when the latter is shifted to its forwardmost position with said enlargement seated in said seat preventing rearward displacement of said tongue relative to said seat and angular displacement of said tongue about the last-mentioned axis, a pair of elongated support arms generally paralleling said sleeve means and pivotally secured to opposite sides of the latter at their forward ends for rotation about upright axes and including means at their rear ends adapted for securement to the forward portion of a vehicle which is to be towed.

2. The combination of claim 1 wherein said sleeve means is horizontally flattened and said arms are pivotally secured to the forward end of said sleeve means and define opposing channels in which the opposite side portions of said sleeve means are embracingly received.

3. A wide range tow bar comprising generally horizontally disposed sleeve means including front and rear ends, an elongated tongue longitudinally slidable through said sleeve means defining a rearwardly opening flared seat, the rear end portion of said tongue including an enlargement seatingly receivable in said seat, said sleeve means and tongue including coacting opposing bearing surfaces preventing angular displacement of said tongue relative to said sleeve means about a horizontal transverse axis, said sleeve means including a transversely restricted forward end portion of limited longitudinal extent through which said tongue is received and providing for limited angular displacement of said tongue relative to said sleeve means about an upstanding axis extending through said tongue and the transversely restricted portion of said sleeve means when said enlargement is rearwardly displaced from said seat, releasable latch means carried by said sleeve means and engageable with said tongue when the latter is shifted to its forwardmost position with said enlargement seated in said seat preventing rearward displacement of said tongue relative to said seat and angular displacement of said tongue about the last-mentioned axis, a pair of elongated support arms are generally paralleling said sleeve means and pivotally secured to opposite sides of the latter at their forward ends for rotation about upright axes and including means at their rear ends adapted for securement to the forward portion of a vehicle which is to be towed, and elongated brace means extending between and interconnecting said arms rearwardly of said sleeve means.

4. The combination of claim 3 wherein said elongated brace means is longitudially extendible.

5. A wide range tow bar comprising generally horizontally disposed sleeve means including front and rear ends, an elongated tongue longitudinally slidable through said sleeve means, said sleeve means defining a rearwardly opening flared seat, the rear end portion of said tongue including an enlargement seatingly receivable in said seat, said sleeve means and tongue including coacting opposing bearing surfaces preventing angular displacement of said tongue relative to said sleeve means about a horizontal transverse axis, said sleeve means including a transversely restricted forward end portion of limited longitudinal extent through which said tongue is received and providing for limited angular displacement of said tongue relative to said sleeve means about an upstanding axis extending through said tongue and the transversely restricted portion of said sleeve means when said enlargement is rearwardly displaced from said seat, releasable latch means carried by said sleeve means and engageable with said tongue when the latter is shifted to its forwardmost position with said enlargement seated in said seat preventing rearward displacement of said tongue relative to said seat and angular displacement of said tongue about the last-mentioned axis, a pair of elongated support arms are generally paralleling said sleeve means and pivotally secured to opposite sides of the latter at their forward ends for rotation about upright axes and including means at their rear ends adapted for securement to and forward portion of a vehicle which is to be towed, and elongated brace means extending between and releasably interconnecting said arms rearwardly of their connections to said sleeve means at their forward ends, said sleeve means including a portion projecting rearwardly of said tongue disposed between said arms, said elongated brace means being releasably secured to said rearwardly projecting portion of said sleeve means.

6. A mounting frame for attaching a tow bar to the apertured free ends of the forwardly projecting front frame horns of a vehicle frame which is to be towed, said mounting frame including a pair of generally parallel arms interconnected at one pair of corresponding ends by a base bight portion, the free ends of said arms including means adapted to pivotally mount the free ends of a pair of hitch arms thereon for rotation about a generally transverse axis extending between said frame arms, said mounting frame, adjacent the intersections of said frame arms and bight portion, including a plurality of sets of apertures adapted to register with corresponding apertures formed in said frame horns, the sets of apertures of each group being spaced longitudinally of a line extending between said frame arms so as to be adapted to register with frame horn apertures of vehicle frames having frame horns spaced different distances apart.

7. The combination to claim 6 wherein said means also includes means adapted to pivotally mount said free ends of said hitch arms on said frame for rotation about parallel axes disposed substantially normal to the first mentioned axis.

8. A tow bar including a base portion having opposite sides and front and rear ends, hitch means supported from and disposed forwardly of said base portion and adapted for pivoted connection with a towing vehicle, a pair of elongated support arms having one pair of corresponding front ends pivotally secured to opposite sides of said base portion and the other pair of ends projecting rearwardly of said base portion and swingable relative to said base portion toward and away from each other between generally parallel and rearwardly divergent positions, the rear ends of said arms including means adapted for securement to a vehicle which is to be towed, said base portion including a rearwardly projecting portion disposed rearwardly of the pivotal connections of said arms with said base portion, and elongated longitudinally extendable brace means releasably fastened at opposite ends to said arms intermediate said front and rear ends thereof and also intermediate its opposite ends to said rearwardly projecting portion of said base portion.

9. The combination of claim 8 wherein said base portion defines elongated sleeve means, an elongated tongue longitudinally slidable through said sleeve means between front and rear extended and retracted positions, said hitch means being carried by the forward end of said tongue, and means operatively associated with said sleeve means and said tongue for releasably retaining said tongue in said extended position.

10. The combination of claim 9 wherein said sleeve means defines a rearwardly opening flared seat, the rear end portion of said tongue including an enlargement seatingly receivable in said seat when said tongue is in said extended position, said sleeve means and tongue including coacting opposing bearing surfaces preventing angular displacement of said tongue relative to said sleeve means about a horizontal transverse axis, said sleeve means including a transversely restricted forward end portion of limited longitudinal extent through which said tongue is received and providing for limited angular displacement of said tongue relative to said sleeve means about an upstanding axis extending through said tongue and the transversely restricted portion of said sleeve means when said enlargement is rearwardly displaced from said seat.

References Cited by the Examiner

UNITED STATES PATENTS

| | | | |
|---|---|---|---|
| 2,399,810 | 5/1946 | Ketcham | 280—491 |
| 2,830,829 | 4/1958 | Gensinger et al. | 280—491 |
| 2,840,392 | 5/1958 | Miles et al. | 280—493 |
| 2,918,310 | 12/1959 | Carson | 280—478 |
| 3,083,040 | 3/1963 | Hayman | 280—493 |

FOREIGN PATENTS

| | | |
|---|---|---|
| 452,257 | 11/1927 | Germany. |
| 586,883 | 4/1947 | Great Britain. |

LEO FRIAGLIA, *Primary Examiner.*